Inventors
A.I.W. Moore
J.H. Porter
G.H. Middle
R.F. Vearncombe
By Watson, Cole, Grindle & Watson
Attys.

Inventors
A.I.W. Moore
J.H. Porter
G.H. Middle
R.F. Yearncombe
By Watson Cole Grindle & Watson
Attys.

Sept. 2, 1969     A. I. W. MOORE ET AL     3,464,098
CUTTING TOOLS
Original Filed Jan. 24, 1966     3 Sheets-Sheet 3
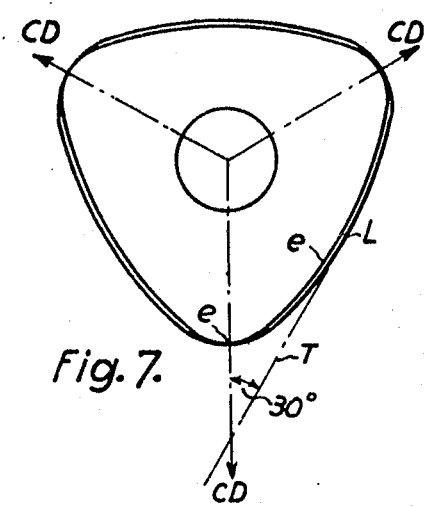
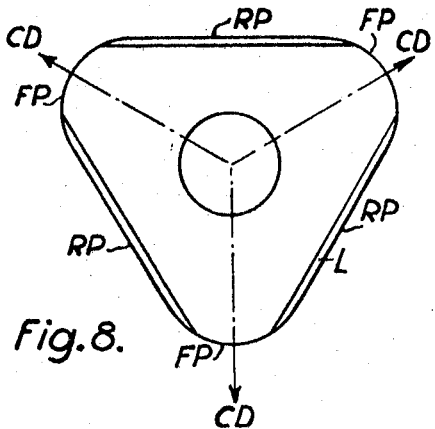
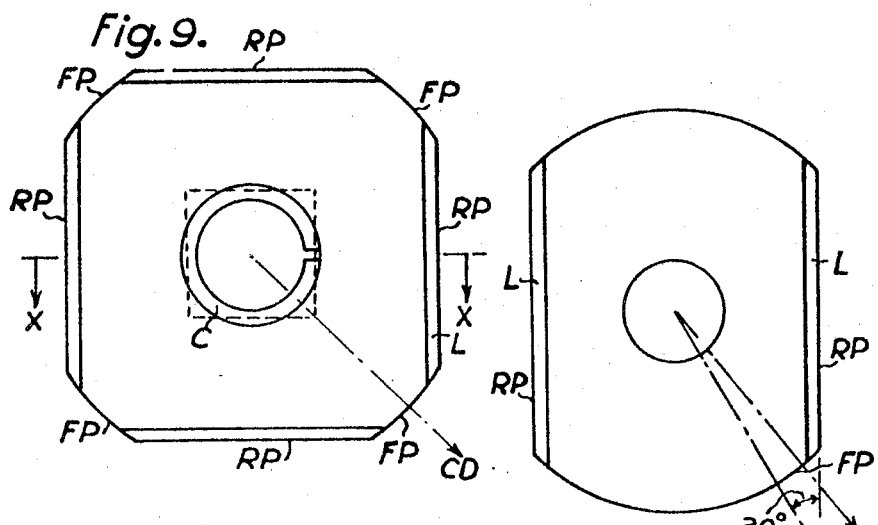
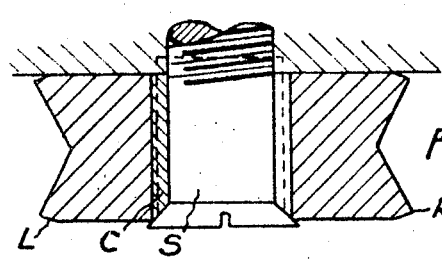
Inventors
A. I. W. Moore
J. H. Porter
G. H. Middle
R. F. Vearncombe
By Watson, Cole, Grindle & Watson
Attys.

3,464,098
CUTTING TOOLS
Arthur Ivan Walter Moore, John Howard Porter, and George Henry Middle, all of Staveley Lodge, Melton Mowbray, Leicestershire, England, and Richard Frank Vearncombe, Oadby, Leicester, England (Staveley Lodge, Melton Mowbray, Leicestershire, England)
Original application Jan. 24, 1966, Ser. No. 533,107. Divided and this application Oct. 31, 1966, Ser. No. 590,953
Claims priority, application Great Britain, Nov. 1, 1965, 46,098/65
Int. Cl. B26d 1/12
U.S. Cl. 29—105                               6 Claims

ABSTRACT OF THE DISCLOSURE

A tool especially a face milling cutter, comprises a body and a detachable indexable bit of slice-like form with a plurality of cutting edges. The end face of the bit is the clearance face and the wall the rake face. Each cutting edge is convex with the greatest curvature at the greatest depth of cut and the thickness of the chip falls to zero at this point so that this zone gives a finishing cut while the other part gives a roughing cut. There may also be additional roughing cutters which cut in advance of the slice-like bit. The latter may be held by a gapped sleeve and a sleeve-expanding screw.

---

This invention relates to cutting tools primarily for metals, which take a comparatively narrow cut and are used with transverse feed, i.e. the feed direction relative to the workpiece is perpendicular to the cutting direction and is parallel to the machined surface if the workpiece is being surfaced as in face milling, shaping or planing, and is parallel to the axis of the workpiece where this is being turned. This feed direction is the usual direction in many machining operations and is to be contrasted with direct feed into the workpiece as in a plunge cut on the lathe. Tools for this type of direct feed into the workpiece are outside the scope of the present invention.

Within the above field the invention is concerned with tools comprising a holder and at least one bit secured thereto. If such a bit is of simple form and small size it can be thrown away when blunt or worn rather than being reground; indeed with some materials it may even be possible to dispense with grinding of some portions of the bit when the bit is first made.

Application Ser. No. 533,107 filed Jan. 24, 1966 (of which this application is a division), discloses a tool of the above kind in which the bit has an edge lying in or near a plane and formed by the junction of an outer face and a side wall which in section in planes parallel to said plane is convex, the holder and bit being constructed to present the bit to the workpiece in such direction that said edge is the cutting edge, said outer face is the clearance face, said side wall forms the rake face against which the chip impinges, and the thickness of the chip cut by the bit diminishes to zero at the point of greatest depth of cut, while the form of said convex section is such that the maximum obliquity of the cutting edge to the cutting direction does not exceed a value which would prevent effective cutting from being achieved.

While for the cutting edge to have the form above specified it is only essential that the clearance face should have a definite form over a narrow zone extending to the cutting edge (provided no other part projects far enough to foul the workpiece) it is simplest and preferred to make the whole face generally flat (apart from openings such as holes or recesses needed to accommodate means for securing the bit to the holder if it is not permanently secured) though the narrow zone extending to the cutting edge is not necessarily coplanar with this generally flat surface. It is also preferred to make the inner face of the bit opposite to the clearance face flat and parallel to the clearance face, the bit having a thickness which is small compared with its other dimensions, so that it can conveniently be referred to as a slice.

The side wall will intersect the outer face of the bit in an edge which extends all round (and which if the whole outer face is flat lies in a plane). The term cutting edge used herein means the total length of that portion of the aforesaid edge which is intended to actually engage the workpiece.

With a bit as set forth in said application due to the thickness of the chip diminishing to zero at the point of the bit which cuts deepest into the workpiece and which is foremost, the part of the cutting edge which is foremost effects what can be regarded as a finishing cut while the part which trails in the cutting direction but leads in the feed direction effects coarse cut and though there may be no precise point of division between the finishing cut and coarse cut with a bit having a continuously curved cutting edge, it is convenient to refer to the finishing part of the edge and the coarse cutting part of the edge.

If the depth of material to be removed is greater than the tool can deal with, and other conditions allow, the holder can carry one or more roughing bits which precede the bit of the invention. In the case of a rotating tool, e.g. a face milling cutter one or more bits may be provided and there may also be one or more roughing cutters which make a preceding cut or cuts.

Though the angle between the clearance face and workpiece or tangent plane to the workpiece may be as low as 1 or 2° it is possible to increase this angle to a value well above the more usual clearance angle value of about 5°, say up to 40°, as by this means the depth of cut can be increased other factors remaining the same; in some cases in accordance with the present invention may then be desirable to depart from an overall flat clearance face of the bit by providing a narrow land adjacent part (in particular the roughing part) or the whole of the cutting edge, which reduces the true clearance angle. Such a land may be flat or curve in section according to the manner in which it is produced. Another factor which enables the depth of cut to be increased is to present the bit so that transversely with respect to the cutting direction the clearance face of the bit is not arranged parallel to the general surface to be produced on the workpiece, or to a tangent plane to that surface, but tilted away from the feed direction at a small angle. This angle may be as much as 30° but will usually not exceed 5°.

While these various factors enter into the determination of the depth of cut which can be employed, another factor of prime importance is the maximum angle of obliquity of the cutting edge to the direction of the cut. With a convex outline this will usually be greatest at the outer end of the roughing part, i.e. the point at which the thickness of the chip is greatest.

If the obliquity is too great i.e. the angle between the tangent at the end of the cutting edge and the direction of cutting is too small, where this end of the cutting edge first strikes the workpiece (a condition which cannot be avoided if only at the commencement of machining) it cannot cut but only strikes the workpiece with consequent unsatisfactory results.

It is for this reason that said application provides for the form of the convex section of the bit to be such that the maximum obliquity does not exceed a value which would prevent affective cutting being achieved in all circumstances of use. A convenient practical value is a minimum of 30° between the tangent to the end of the cutting edge and the direction of cutting, and desirably this angle is more than 30°.

The bit could be permanently secured to the holder as by brasing, but is preferably removable, suitably being clamped by a central clamping screw, enabling it to be angularly adjusted (indexed) about the axis of the screw. This not only enables small adjustments in the presentation of the bit to the workpiece to be made, but if the complete outline of the bit is suitably shaped, enables a plurality of cutting edges. to be brought into action in succession as each edge becomes blunt or worn.

A complete circular outline centered in the damping clamping screw can be indexed in this way through care is needed to ensure that at least the whole of the finishing part of the edge is replaced by a new part. A cutting edge which is not a simple circular arc centred in the clamping screw may be used however, and in such cases the total outline will be lobed. One advantage of this is that for a given length of cutting edge and limit of obliquity the volume of the bit becomes smaller thus economising in the expensive material of which the bit is usually made and the proportion of this material which does not take part in the actual cutting.

Limitation of the minimum angle between the tangent to the end of the cutting edge and the direction of cutting to 30° means that with a circular outline, the angle subtended by the cutting edge from the foremost point to the end of the roughing part is limited to 60° and often only a smaller subtended angle can usefully be employed for other reasons, i.e. obliquity is not always critical. This limits the length of the cutting edge as a function of the diameter of the bit, or in other words the greater the length of the cutting edge required the greater must be the diameter of the bit.

One way in which the length of cutting edge can be increased for a given diameter of the bit (or in other words for a given length of cutting edge the diameter and therefore the volume of the bit can be reduced), is to modify a simple circular arcuate form by shaping the outline of the cutting edge as a continuous curve of decreasing curvature in proceeding from the finishing to the roughing or coarse cutting part. There may be a continuous change of curvature as with a true elliptical outline, or the curvature may decrease in steps so that the outline becomes an oval consisting for example of two or three circular arcs as in common drawing office approximations to an ellipse. Such forms can be repeated two or more times up to perhaps six over the complete periphery. With six lobes of this form the angular length of the cutting edge is not increased compared with what can be used in the limit with a circular outline but the obliquity at the end can be so brought to well below the limiting value of 30°, or the volume be reduced compared with a complete circular outline.

Other possibilities are to make the cutting edge up of several arcs not running into a continuous curve or of a convex curved finishing part, e.g. a circular arcuate part, and a roughing or coarse cutting part of one or more straight sections. Such forms the curvature of which as a whole decreases in proceeding from the finishing to the coarse cutting part, are not difficult to produce and again can be arranged for indexing.

Another point of importance is the rake angle of the bit. The side wall section in planes perpendicular to the clearance face of the bit is desirably straight and it is directed so that in conjunction with the clearance angle measured in a plane through the cutting direction it gives the desired rake angle in the last mentioned plane, i.e. front rake angle. Thus if the section of the wide wall is normal to the flat faces of the bit, the rake will be negative and the negative rake angle will be equal to the clearance angle (assuming the whole clearance face is flat). If a rake angle of different value from that of the clearance angle is desired the wall surface may be a conical, pyramidal or similar frustum (using these terms in a broad sense to cover forms which are not of circular section or regular polygonal section and also to cover forms made up of curves and straight lines), the apex angle, which may be up to say 90°, being chosen to give a negative, zero, or positive front rake angle as may be desired. The rake angle may range from 30° negative to 30° positive but will usually be from 5° negative to 20° positive.

Where there is a narrow land extending to the cutting edge to give a true clearance angle different from that between the general plane of the main part of the clearance face and the workpiece (or tangent plane to the workpiece), it will be understood the relationship between the rake angle and the clearance angle above described will apply to the rake angle and the angle between the main part of the clearance face and the workpiece or tangent plane.

It will be clear that if the side wall is normal to the clearance face and the bit is a parallel-faced slice, there will be two edges, a part of either of which can serve as the cutting edge provided the outline is of such symmetrical form as to allow the bit to be presented either way up. This is manifestly the case with a circular outline when the bit is a short cylinder; lobed forms can also easily satisfy this requirement. Then when the whole of one edge has been used by indexing successive portions, the bit can be turned over and the other edge used, thus enabling greater use to be made of the material before being thrown away or reground.

In the case of a side wall at an angle to provide a different clearance angle or rake angle, the bit can still be made double sided by making it taper from both faces to a minimum area of cross section. It is unlikely that such a value of negative rake would ever be required which would involve tapering the other way but if needed it is equally possible to make a bit so tapered which could be turned over.

The possibility of turning the bit over applies also to cases in which a narrow flat land is formed adjacent each cutting edge to provide a reduced true clearance angle.

The invention is applicable to tools for turning, shaping, planing and miling especially face milling. It will be further described with reference to examples diagrammatically illustrated in the accompanying drawings.

FIGURES 7 to 9 are plan views from below of further forms of bit for tools in accordance with the present invention.

FIGURE 10 is a section of FIGURE 9 on the line X—X also showing a clamping arrangement for the bit.

FIGURE 11 is a plan view from below of yet another form of bit for a tool in accordance with the invention.

Figure 1:
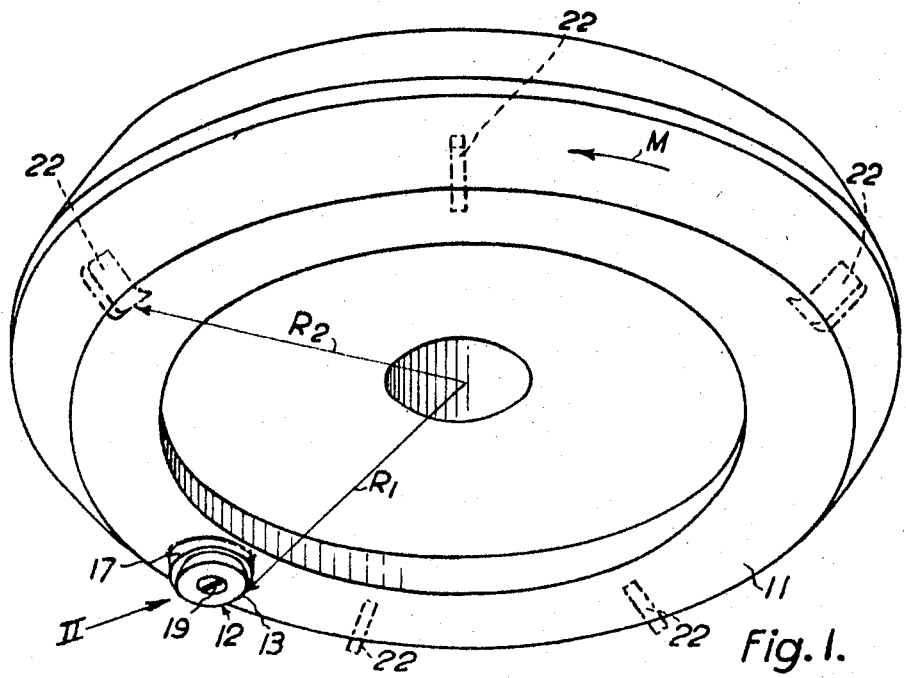
FIGURE 1 is a perspective view from below of a face milling tool in accordance with said application with a bit of circular outline.
Figure 2:
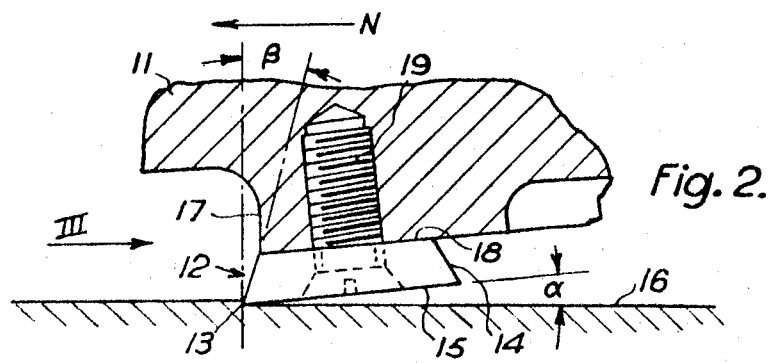
FIGURE 2 is a detail section looking in the direction of the arrow II in FIGURE 1, without any transverse inclination of the bit being shown.

The face milling tool shown in FIGURES 1 and 2 comprises a holder or body 11 carrying a bit 12 of circular outline, in the form of a parallel faced frusto-conical slice of cutting material (e.g. high speed steel or so-called "hard metal" such as tungsten carbide granules held in a matrix of cobalt). The cutting edge 13 is formed by the junction of conical side wall 14 with the larger outer flat face 15 of the bit and the manner in which the bit is presented to the workpiece 16 is determined by a flat-faced seating here formed on a boss 17 on the body 11 against which the inner flat face 18 of the bit is pressed by a clamping screw 19 the head of which is received in a countersink in the bit. It will be seen that the clamping screw 19 which serves to secure the bit 12 to the holder 11 is wholly behind the cutting edge 13 and that no part projects substantially beyond the outer face of the bit and thus does not impinge into the clearance between the bit and the work piece.

The tool is rotated and fed transversely in juxtaposition to the workpiece 16. The direction of rotation of the tool is indicated by the arrow M in FIGURE 1 and the cutting direction by the arrow N in FIGURE 2. As FIGURE 2 shows the boss 17 is shaped so that the outer flat face 15 of the bit is the clearance face and makes a clearance angle with the machine surface of the workpiece 16, while the front rake angle $\beta$ is equal to the semi-apex angle of the cone less $\alpha$. Instead of the seating being formed on a boss it may be wholly or partly recessed into the body 11.

Figure 3:
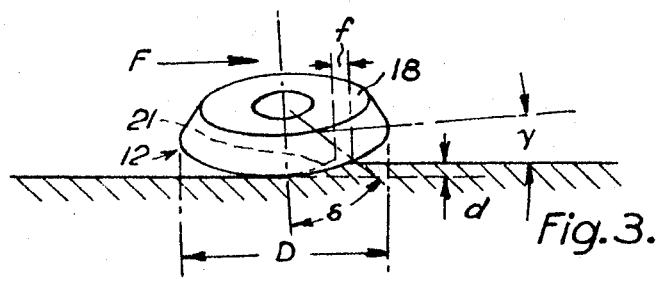
FIGURE 3 is an elevation taken in the direction of the arrow III in FIGURE 2, showing transverse inclination or tilting of the bit.

FIGURE 2 assumes that the axis of the screw 19 lies in the plane of the drawing, i.e. a plane perpendicular to the plane of the machined surface of the workpiece. This will usually be the case but the axis of the screw may be tilted through a small angle $\gamma$, FIGURE 3, in other words the clearance face 15 may be tilted away from the feed direction (arrow F) by the small angle $\gamma$. FIGURE 3 also shows angular length $\delta$ of the cutting edge for a depth of cut $d$, the clearance angle $\alpha$, angle of tilt $\gamma$, and diameter D of the face 15 of the bit.

The dotted line 21 indicates the boundary of the cross-section of the chip produced for a feed increment of $f$; it will be seen that the chip diminishes in thickness from a maximum at the end (trailing in the cutting direction but leading in the feed direction of the cutting edge) down to zero at the foremost point of the cutting edge.

The obliquity of the cutting edge to the cutting direction is zero at the leading end of the cutting edge, and increases towards the trailing end of the cutting edge. As above noted the tangent at the trailing end should not be at less than about 30° to the feed direction F if satisfactory cutting is to be achieved, which means that the angle $\delta$ must not exceed 60° (with some very slight variation due to the setting of the face 15 at the angles $\alpha$ and $\gamma$). Consideration of FIGURES 2 and 3 will show that as either of the angles $\alpha$ and $\gamma$ are increased, the depth of cut $d$ will increase for a given value of the angular length $\delta$.

It will also be clear from FIGURES 1 to 3 that when the cutting edge is blunted or worn, by loosening the screw 19, the bit can be indexed through a sufficient angle to bring at least a new finishing part of the cutting edge into action and then be tightened. If the angle is at least $\delta$ a wholly new cutting edge will be brought into action. The face 18 of the bit and of the boss 17 can be serrated or recessed to improve the grip, or pins or other means may be used to prevent slip if necessary, since the cutting reaction does not pass through the axis of the screw 19 and therefore exerts a turning moment on the bit. An arrangement which positively prevents slip and facilitates indexing will be described later.

The tool shown in FIGURES 1 to 3 has only a single bit. Its output can be increased by providing more bits distributed at the same radius so that the tool becomes a multi-tooth cutter instead of a fly-cutter. However, the bits need to be mounted very accurately if they are to share the cutting evenly. To facilitate this, separately made seatings may be secured to a holder of simple form in place of integral bosses such as the boss 17 or integral recessed seatings. Then the seatings can easily be made to very close limits by the aid of a fixture and then be secured, e.g. dowelled, to the holder which being of simple form can also be accurately made without difficulty. This method avoids the difficulties which arise if the holder has to be indexed for machining integral seatings. The bits themselves are also easily made to close limits, in particular in thickness and this also applies to the more elaborate forms to be described later.

Since the tools effect both a coarse cut and a finishing cut, no rough machining operation is necessary unless the depth of material to be removed from the workpiece is greater than can be dealt with by the tool. In particular cases if it should be necessary the holder 11 can have a number of roughing bits distributed around it as indicated in dotted lines at 22 in FIGURE 1. These bits 22 may be of conventional shape in the form of throw-away inserts. It is important that that part of the cutting edge of the bit 12 which first contacts the workpiece should be nearer to the axis of the holder 11 than the corresponding parts of the roughing bits 22 i.e. the radial distance R1 in FIGURE 1 should be smaller than the distance R2, so that the roughing bits machine the workpiece before the bit 12 engages it.

Figure 4:
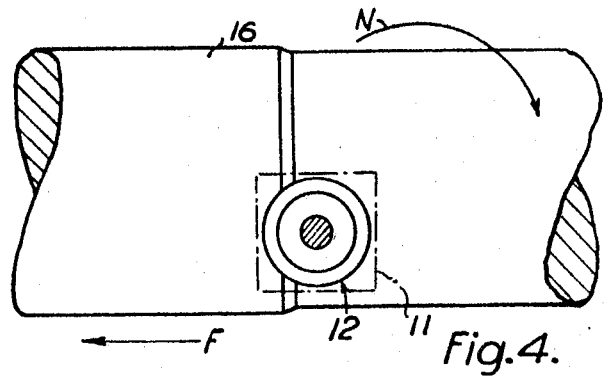
FIGURE 4 is a side elevation of a cylindrical bar being turned by a tool in accordance with the invention, with a bit of circular outline.
Figure 5:
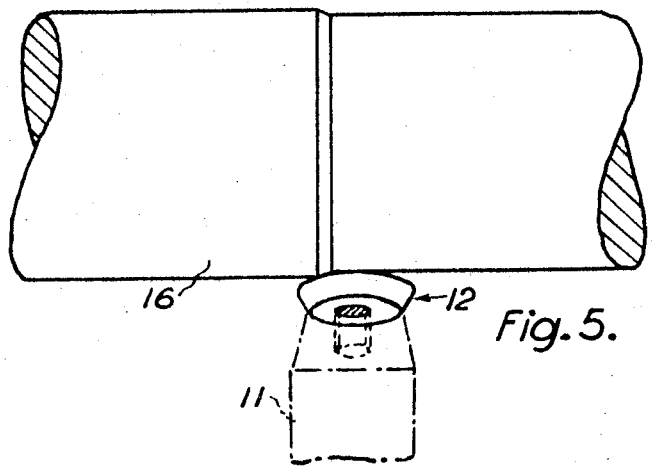
FIGURE 5 is a plan view of FIGURE 4.
Figure 6:
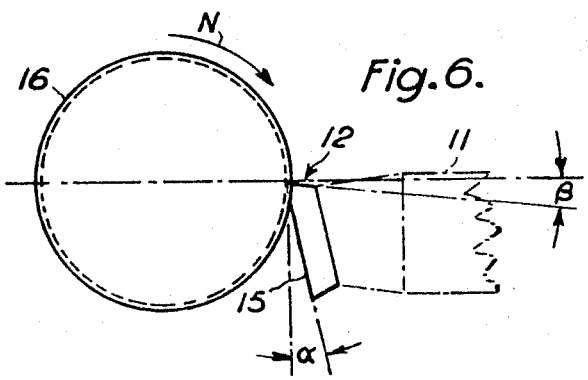
FIGURE 6 is an end view of FIGURE 4.

FIGURES 4 to 6 illustrate the use of the tool for a turning operation. The same parts bear the same references as in FIGURES 1 to 3 and do not require any further description. However, the holder 11 is in the form of a bar which can be clamped in the tool holder of a slide rest. No tilt of the bit is shown in FIGURE 5 but the bit can be tilted by providing the face on the end of the holder 11 at the appropriate tilt, or by setting the holder 11 at the appropriate angle as seen in plan view.

A tool similar to that shown in FIGURES 4 to 6 can be used for shaping or planning. Such differences as may be desirable in the holder will be clear to those skilled in the art without further description.

FIGURES 1 to 6 show the use of a bit of simple circular outline. As explained above the angular length of cutting edge can be increased without excessive obliquity or the maximum angle of obliquity be decreased for a given angular length of cutting edge by modifying a simple circular arcuate form, thus enabling the volume of the bit to be reduced for a given section of chip. The remaining figures relate to examples.

A cutting edge in the form of a continuous curve of decreasing curvature (i.e. which increases in radius) in proceeding from the finishing to the coarse cutting part, which has the desired result is shown in inverted plan in FIGURE 7 in which for one cutting edge the cutting direction is marked CD and the tangent at 30° is marked T while the ends of the length of the cutting edge are marked $c, e$.

Here the cutting edge comprises an arcuate finishing part of small radius and a coarse cutting part of large radius, so that the curvature decreases in one step. The rest of the outline is obtained by completing the arcs. There may however be more than one step in the decreasing curvature, or the decrease itself may be continuous as above explained.

Forms in which the cutting edge is made up of a curved, e.g. simple circular arcuate finishing part and a coarse cutting part of a single straight section are illustrated in the remaining figures.

A maximum obliquity (30° between a straight coarse cutting part and the cutting direction) and provision for indexing leads to an equilateral triangular form with the apices replaced by arcuate finishing parts, as shown in inverted plan in FIGURE 8, in which the three arcuate finishing parts are marked FP, the three coarse cutting parts RP, and the cutting direction CD.

If less obliquity is allowed, say 45°, a square form with the corners replaced by arcuate finishing parts results as shown in inverted plan FIGURE 9, and in section in FIGURE 10, in which the four finishing parts are marked FP, the four coarse cutting parts RP and the cutting direction CD. In this case since 45° is well above the practical limit of 30°, some adjustment of the direction CD is possible without difficulty arising, for instance for adjusting the width of the chip cut by the finishing part as will be explained later.

FIGURE 11 illustrates in inverted plan another possible form which incorporates only two repeats but which enables the cutting direction to be anywhere between CD at which the obliquity is 30° and $CD_2$ at which the finishing part is at a minimum length. The part of the convex curve which does not actually cut could be of any form which avoided interference but a circular arc over the whole length is simple to produce. The complete outline thus becomes two opposite concentric circular arcs of equal length and two parallel straight sides.

The above are only examples and other forms are possible within the scope of the invention.

As above described to enable the depth of cut with a given size to be increased the bit is presented with its under outer face inclined at a greater angle than would normally be chosen for a clearance angle. It is found that if the narrow zone of the clearance face actually extending to the cutting edge is coplanar with the general flat outer surface of the bit, this is likely to cause at least the coarse cutting part of the cutting edge to be damaged near the trailing ends because the effective clearance angle of the coarse cutting part is greater than the angle of inclination of the clearance face as a whole. To deal with this a narrow land marked L in FIGURES 7 to 11 may be provided on the outer face extending back from the cutting edge, thereby to reduce the effective clearance angle to a more appropriate value. This land can be provided along the whole cutting edge, but it is found that the arcuate finishing part is much less prone to damage and the land may be omitted from this part. This is preferable, especially where a series of bits is used on a holder for example in face milling since it simplifies disposing all the bits so that they cut equally. Such a land can also be provided on bits of circular outline, either along the parts or parts intended only for coarse cutting or round the whole periphery. The land is shown flat but may be of curved section if the mode of production makes this more convenient.

It is found that in machining some materials the width of chip removed by the foremost arcuate finishing part of the cutting edge affects the surface finish of the workpiece. With bits of the forms shown in FIGURES 7 to 11 and other similar forms, this width can be adjusted as necessary by adjusting the precise setting of the bit in relation to the cutting direction. In the case of a single bit cutter as in FIGURE 1 such adjustment may be made by rotation on the axis of a single central screw holding the bit, but in the case of a multi-bit cutter it may be necessary to adjust means on the holder which determines the setting of the bits.

Bits according to the invention may be produced or finished by grinding and similar operations from stock material, or be sintered to final form from so-called hard metals. In the latter case it may be possible to dispense with grinding of the side wall but usually overall thickness is of importance, thus requiring grinding of the inner and outer surfaces.

Where indexing by rotation on a holding screw is to be provided for, one suitable way of holding the bit is by a countersink headed screw S, FIGURE 10, which does not engage a countersink in the bit itself, but a countersink in a gapped sleeve C, the screw just clamping down the sleeve and then expanding it in the bore in the bit. The bit needs to be held down on the holder during tightening of the screw. As shown the sleeve is cylindrical on its external surface and the bore in the bit matches so that there is no impediment to indexing through any angle or locking against slipping. If the bore in the bit is given a noncircular section (e.g. polyognal) and the external surface of the sleeve matches, and the sleeve enters a corresponding recess in the holder, a positive lock is obtained and positive control of indexing if the latter is permitted at all. With the bit as in FIGURES 9 and 10 which needs to be indexed into four positions, the sleeve and bore may be of square section as indicated by the chain lines CS, As also indicated by these lines, the sleeve enters a recess in the holder. Other sections will be used for other numbers of indexing positions to be provided for and similar arrangements may be used for circular bits.

FIGURE 10 also illustrates an example of a bit which while having an inclined side wall, has an edge at both faces, parts of which can be used as cutting edges, i.e. a bit which tapers from both faces and can be turned over. This scheme is generally applicable to a bit of any outline.

By way of example a bit used in a tool according to the present invention may be from ⅛ to ⅜ inch thick and its diameter may be from ½ to 1½ inches.

We claim:

1. A face milling tool comprising a holder adapted to be held for rotation about an axis and at least one bit secured thereto at a distance from said axis and projecting axially beyond any part of said holder in which the bit has an edge formed by the junction of an outer face which is flat at least in a zone extending to this edge and an outer side wall which in section in planes parallel to said outer face is at least in part curved with a curvature which is convex and has a form which as a whole decreases in curvature in proceeding from a finishing to a coarse cutting part of the bit, the holder and bit being constructed to present the bit to the workpiece in such direction when the holder is rotated and fed transversely in juxtaposition to the workpiece that said edge is the cutting edge, said outer face is the clearance face, said outer side wall forms the rake face against which the chip impinges during cutting, said finishing and coarse cutting parts are so located that having regard to the feed direction the coarse cutting part encounters the workpiece before the finishing part and the thickness of the chip diminishes to zero at the point of greatest depth of cut, while the form of said section of the outer side wall is such that the maximum obliquity of the cutting edge to the cutting direction does not exceed a value which would prevent effective cutting from being achieved.

2. A face milling tool according to claim 1 in which said curvature decreases in steps.

3. A face milling tool according to claim 1 in which said cutting edge is made up of a curved finishing part and a roughing part made up of at least one straight section.

4. A face milling tool according to claim 3 in which the complete outlines of the bit comprises two opposite convex curves of equal length and two parallel straight sides.

5. A face milling tool according to claim 4 in which the said cutting edges are formed along the two curves by the junction of said face with the side walls of the bit and along the straight sides by the junction with the side walls of the bit of narrow lands extending from said face, said lands being directed to reduce the true clearance angle.

6. A face milling tool according to claim 1 in which said bit has an axis about which it is indexably secured to said holder and has a plurality of similar cutting edges distributed around its axis, so that any one edge can be brought into position to serve as the effective cutting edge.

References Cited

UNITED STATES PATENTS

| | | |
|---|---|---|
| 617,002 | 1/1899 | Willard. |
| 1,438,876 | 12/1922 | Thomas. |
| 2,586,955 | 2/1952 | Kaiser _____ 29—105 |
| 2,645,003 | 7/1953 | Thompson _____ 29—105 |
| 2,678,487 | 5/1954 | Onsrud _____ 29—105 |
| 3,121,939 | 2/1964 | Williams _____ 29—96 |
| 3,142,110 | 7/1964 | Hertel _____ 29—96 |

FOREIGN PATENTS

| | | |
|---|---|---|
| 607,770 | 9/1948 | Great Britain. |
| 1,278,870 | 11/1961 | France. |

HARRISON L. HINSON, Primary Examiner

U.S. Cl. X.R.

29—96